United States Patent
Liu et al.

(10) Patent No.: US 12,165,444 B2
(45) Date of Patent: *Dec. 10, 2024

(54) METHOD AND SERVER FOR SUPPORTING GENERATION OF SCENARIOS FOR TESTING AUTONOMOUS DRIVING AND/OR ADVANCED DRIVER ASSISTANCE SYSTEM FUNCTIONALITY

(71) Applicant: ZENUITY AB, Gothenburg (SE)

(72) Inventors: Feng Liu, Gothenburg (SE); Majid Khorsand Vakilzadeh, Mölndal (SE)

(73) Assignee: ZENUITY AB, Gothenburg (SE)

( * ) Notice: Subject to any disclaimer, the term of this patent is extended or adjusted under 35 U.S.C. 154(b) by 398 days.

This patent is subject to a terminal disclaimer.

(21) Appl. No.: 17/607,284

(22) PCT Filed: May 11, 2020

(86) PCT No.: PCT/EP2020/063017
§ 371 (c)(1),
(2) Date: Oct. 28, 2021

(87) PCT Pub. No.: WO2020/239416
PCT Pub. Date: Dec. 3, 2020

(65) Prior Publication Data
US 2022/0222982 A1    Jul. 14, 2022

(30) Foreign Application Priority Data

May 27, 2019   (EP) ..................... 19176742

(51) Int. Cl.
*G07C 5/08*   (2006.01)
*G06T 19/00*   (2011.01)

(52) U.S. Cl.
CPC .......... *G07C 5/0808* (2013.01); *G06T 19/006* (2013.01)

(58) Field of Classification Search
CPC .... G07C 5/0808; G06T 19/006; G09B 9/006; G09B 25/00
See application file for complete search history.

(56) References Cited

U.S. PATENT DOCUMENTS

| 11,945,465 B2 * | 4/2024 | Liu ..................... B60W 50/045 |
| 2017/0270236 A1 * | 9/2017 | Yamaura ................. G06F 30/20 |

(Continued)

OTHER PUBLICATIONS

3DCoAutoSim: Simulator for Cooperative ADAS and Automated Vehicles, 2018 21st International Conference on Intelligent Transportation Systems, IEEE, Nov. 4-7, 2018 (Year: 2018).*

(Continued)

*Primary Examiner* — Anne Marie Antonucci
*Assistant Examiner* — Patrick M Brady
(74) *Attorney, Agent, or Firm* — DUANE MORRIS LLP; Gregory M. Lefkowitz (57) ABSTRACT

Method and server for supporting generation of scenarios for testing autonomous driving and/or advanced driver assistance system, AD/ADAS, functionality for real world vehicles. A server (101; 500) provides (301) a virtual environment (200) simulating an environment relevant for operation of vehicles having said AD/ADAS functionality and in which is operating: fully computer controlled movable virtual objects (230*a-c*), human controlled movable virtual objects (220*a-c*) and at least one virtual AD/ADAS vehicle (210) operating according to said AD/ADAS functionality. The server (101; 500) allows devices (101-103) to remotely connect to the server (105; 500) and users of said devices (101-103) to, via user interfaces of the devices (101-103), control said human controlled movable virtual objects (220*a-c*), respectively, in the virtual environment (200), and thereby cause generation of scenarios that said at least one virtual AD/ADAS vehicle (210) is subjected to.

14 Claims, 5 Drawing Sheets

(56) References Cited

U.S. PATENT DOCUMENTS

2018/0267538 A1* 9/2018 Shum .................... B60W 30/09
2019/0355073 A1* 11/2019 Lee ........................ G06Q 50/10

OTHER PUBLICATIONS

3DCoAutoSim: Simulator for Cooperative ADAS and Automated Vehicles, 2018 21st International Conference on Intelligent Transportation Systems (ITSC), IEEE (Year: 2018).*

Buse, D.S., et al., "Demo Abstract: Integrating a Driving Simulator with City-Scale VANET Simulation for the Development of Next Generation ADAS Systems," IEEE Infocom 2018—IEEE Conference on Computer Communications Workshops, Apr. 15, 2018, pp. 1-2.

Vernaza, A. et al., "Simul-A2: Agent-based Simulator for evaluate ADA Systems," 17th International Conference on Information Fusion, International Society of Information Fusion Jul. 7, 2014, pp. 1-7.

\* cited by examiner

METHOD AND SERVER FOR SUPPORTING GENERATION OF SCENARIOS FOR TESTING AUTONOMOUS DRIVING AND/OR ADVANCED DRIVER ASSISTANCE SYSTEM FUNCTIONALITY

CROSS-REFERENCE TO RELATED APPLICATIONS

This application is a § 371 national stage entry of International Application No. PCT/EP2020/063017, filed on May 11, 2020, which claims priority to European Patent Application No. 19176742.5, filed on May 27, 2019, the entire contents of which are incorporated herein by reference.

TECHNICAL FIELD

Embodiments herein concern a method and server relating to generation of scenarios for testing autonomous driving and/or advanced driver assistance system, AD/ADAS, functionality of a vehicle.

BACKGROUND

Unsupervised autonomous driving (AD) functions, as well as functionality of advanced driver assistance systems (ADAS), which may be referred to as AD and/or ADAS (AD/ADAS) functionality, need to be evaluated and proven to handle all relevant traffic scenarios in their defined operational design domain (ODD) before deployment. However, due to a low exposure rate of safety critical scenarios, several billion kilometers of supervised road testing may be needed to confidently validate safe behavior, in particular for autonomous vehicles (AVs). Even under aggressive testing assumptions and/or conditions, existing fleets of vehicles implementing AD/ADAS functionality may require tens or hundreds of years of driving in the real world in real time to be exposed to corner case scenarios and learn about them, and thereby be able to validate against them. This approach alone is obviously unfeasible which, in turn, would hinder the market penetration for particularly AD technology.

Variations in definition of corner case exist. As used herein, corner case may correspond to what may be referred to as long tail events, and may be explained as a case that exposes a test subject, e.g. vehicle with AD/ADAS functionality, to a circumstance that is far outside what the test subject normally should be exposed to and normally be able to handle, e.g. a circumstance unlikely to occur but that still could occur, and that, if the test subject is exposed to it, the test subject should or must be able to handle, e.g. be able to detect and take suitable action upon. A corner case scenario in relation to AD/ADAS functionality of a vehicle is thus a scenario that exposes the AD/ADAS functionality of the vehicle to a corner case.

It lies in the nature of corner case scenarios that it they are often difficult to theoretically predict or compute and they may need to be identified by experiencing them.

The many miles, time and resources, required for real world testing of AD/ADAS functionality of vehicles motivated leading companies in the development of AD cars to virtually simulate many autonomous miles before deploying their software implementing the AD/ADAS functionality in the real vehicles for use in real world environments and on real roads. Driving billions of miles virtually is cost and time efficient.

SUMMARY

In view of the above, an object is to provide one or more improvements or alternatives in relation to the prior art regarding testing of AD/ADAS functionality in vehicles.

According to a first aspect of embodiments herein, the object is achieved by a method, performed by a server, for supporting generation of scenarios for testing autonomous driving and/or advanced driver assistance system, AD/ADAS, functionality for one or more real world vehicles. The server provides a virtual environment simulating an environment relevant for operation of one or more vehicles having said AD/ADAS functionality. In the virtual environment it is operating: one or more fully computer controlled movable virtual objects, one or more human controlled movable virtual objects and at least one virtual AD/ADAS vehicle operating according to said AD/ADAS functionality. The server allows devices to remotely connect to the server and users of said devices to, via user interfaces of the devices, control said human controlled movable virtual objects, respectively, in the virtual environment, and thereby cause generation of scenarios that one or more of said at least one virtual AD/ADAS vehicle are subjected to. The scenarios resulting from at least one of said one or more human controlled movable virtual objects affecting one or more of the following: said one or more fully computer controlled movable virtual objects, said at least one virtual AD/ADAS vehicle, the virtual environment.

According to a second aspect of embodiments herein, the object is achieved by a computer program comprising instructions that when executed by one or more processors causes the server to perform the method according to the first aspect.

According to a third aspect of embodiments herein, the object is achieved by a carrier comprising the computer program according to the second aspect.

According to a fourth aspect of embodiments herein, the object is achieved by a server for supporting generation of scenarios for testing autonomous driving and/or advanced driver assistance system, AD/ADAS, functionality for one or more real world vehicles. The server is configured to provide a virtual environment simulating an environment relevant for operation of one or more vehicles having said AD/ADAS functionality. In the provided virtual environment it is operating: one or more fully computer controlled movable virtual objects, one or more human controlled movable virtual objects and at least one virtual AD/ADAS vehicle operating according to said AD/ADAS functionality. The server is further configured to allow devices to remotely connect to the server and users of said devices to, via user interfaces of the devices, control said human controlled movable virtual objects, respectively, in the virtual environment, and thereby cause generation of scenarios that one or more of said at least one virtual AD/ADAS vehicle are subjected to. The scenarios resulting from at least one of said one or more human controlled movable virtual objects affecting one or more of the following: said one or more fully computer controlled movable virtual objects, said at least one virtual AD/ADAS vehicle, the virtual environment.

The server may further, and/or may further be configured to, initiate identification that a certain scenario has occurred. The identification may be based on data generated in relation to one or more of said at least one virtual AD/ADAS vehicle. Said data generated in relation to the one or more of said at least one virtual AD/ADAS vehicle may comprise data generated external from the one or more of said at least one virtual AD/ADAS vehicle.

In some embodiments, the identification is based on scenario identifying information received from one or more of said devices.

Moreover, the server may, and/or may be configured to, send, to a device that was used to control a human controlled movable virtual object and thereby caused generation of said certain scenario, information that identifies participation in generation of said certain scenario.

Furthermore, the server may, and/or may be configured to, store data that enables at least part of said certain scenario to be re-created and thereby enable the same or another virtual AD/ADAS vehicle to be subjected to said at least part of said certain scenario at another occasion.

Said fully computer controlled movable virtual objects may comprise said at least one virtual AD/ADAS vehicle.

In some embodiments, one or more of said at least one virtual AD/ADAS vehicle are during operation in the virtual environment (200) provided with a respective identifier that enables users of the devices to, via user interfaces of the devices, identify such virtual AD/ADAS vehicle as being a certain type of virtual vehicle operating in the virtual environment.

Moreover, in some embodiments, one or more of the fully computer controlled movable virtual objects are fully computer controlled virtual vehicles that during operation in the virtual environment are provided with identifiers, respectively, that enables users of the devices to, via user interfaces of the devices, identify that these are fully computer controlled. Is some embodiments, one or more of the human controlled movable virtual objects are human controlled movable virtual vehicles that during operation in the virtual environment are provided with identifiers, respectively, that enables the users to, via user interfaces of the devices, identify that these are human controlled.

Furthermore, in some embodiments, one or more of the human controlled movable virtual objects are human controlled virtual vehicles, and one or more of the fully computer controlled virtual movable objects are fully computer controlled virtual vehicles. In these embodiments, the server may, and/or may be configured to, control the ratio of human controlled virtual vehicles to fully computer controlled virtual vehicles operating in the virtual environment. The ratio may be controlled to be maintained at a certain level.

Embodiments herein expose the virtual AD/ADAS vehicle to, and the scenarios are generated in a context of, mixed human and computer controlled movable virtual objects during operation in virtual environment and enables scenario generation in a mix of AVs and human controlled vehicles that is not yet available in the real world. Further, multiple users can contribute and assist in scenario generation and identification. A generated scenario can be considered to correspond to a test case that e.g. can be re-used for testing of AD/ADAS functionality. In particular, embodiments herein may increase the possibility for corner case scenarios to be generated and identified. Single user on a single device is further the most common way for users today to participate in various virtual contexts, e.g. computer games, and doing this over computer networks, with central server(s) providing virtual environments and allowing users to remotely connect, is increasingly popular. Embodiments herein enable to take advantage of this and thereby facilitate reaching many users that can contribute in scenario generation and identification. Crowdsourced performance of the method is thus facilitated, involving multiple devices with respective users, thereby further increasing the possibility for generation of interesting scenarios in a time and cost efficient manner.

Hence, in general, embodiments herein provide improvements regarding testing of AD/ADAS functionality in vehicles.

BRIEF DESCRIPTION OF THE DRAWINGS

Examples of embodiments herein are described in more detail with reference to the appended schematic drawings, which are briefly described in the following.

DETAILED DESCRIPTION

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As a development towards embodiments herein, the situation indicated in the Background will first be further elaborated upon.

Although virtually simulating many autonomous miles is time and cost efficient vs. test driving in the real world, it cannot and should not replace real world testing and testing involving humans, at least not as long there are actual humans involved in real world environments and scenarios that AD/ADAS vehicles will be subjected to. The human factor should not be forgotten and human creativity not be neglected.

Rule based control algorithm design is limited by the initial setting of all the rules, and it can easily miss or involve design errors when the multiple rules need to be considered. Formal method is one of the ways to solve verification challenge of testing complex rule based control algorithm, but it requires good modelling of the algorithm. Machine learning based control algorithm is limited by its training samples. AD/ADAS system testers normally design testing scenarios or drive vehicles on public road for collection of scenarios. However, some scenarios cannot be covered well by designing or real world driving, including corner case scenarios, but which are very valuable for AD/ADAS system and functionality validation.

In a fully computer-controlled dynamic environment with e.g. moving AI controlled objects trained based on data set generated from real word driving, these typically do not include rare safety critical behavior and typically no or insufficient data regarding corner cases. The interaction of computer-controlled objects with AVs may eventually generate some combinatorial interesting test scenarios, but it is not able to generate all corner case scenarios that may occur and may be of interest in the real world. It would e.g. be of interest to be able to increase the possibility for corner case scenarios to be generated without having to drive in the real world using real world vehicles, at least not for tens or hundreds of years.

Crowdsourcing is a process that includes outsourcing a task to a distributed group of people. An idea underlying embodiments herein was to facilitate crowdsourcing the task of validating AD/ADAS functionality to individuals around the globe, which may have an interest in or are motivated by other means to, in e.g. a simulation environment or video game, contribute in imposing risky and potentially safety-critical scenarios to vehicles with AD/ADAS functionality.

Figure 1:
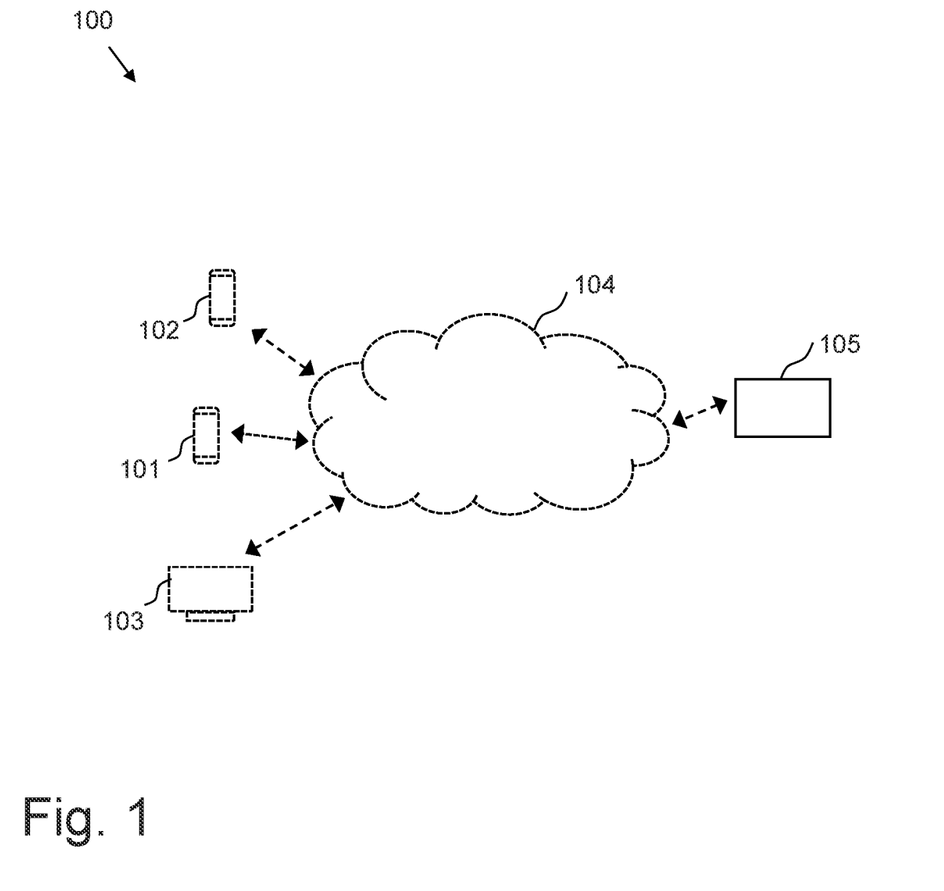
FIG. 1 is a block diagram schematically depicting a system to be used for discussing embodiments herein.

FIG. 1 is a block diagram schematically depicting a system 100 to be used for discussing embodiments herein.

The system 100 involves one or more client or user devices, or simply devices, exemplified by devices 101-103 in the figure and that may operate according to embodiments herein. The devices 101-103 are associated with users, respectively, and may be of different types, e.g. smart phones, laptop or desktop personal computers, gaming consoles, etc. The devices 101-103 thus have computer and data processing capabilities. In the shown example, the devices 101, 103 are illustrated as smart phones and the device 102 as another type, e.g. a desktop computer, to illustrate the principle. One or more of the devices 101-103 may thus be, but are not limited to, devices with wireless communication capabilities, i.e. wireless communication devices. The device 101 will be used as primary example below when discussing embodiments. The devices 101-103 may further be connected to a computer network 104, e.g. the Internet, and may be communicatively connected, e.g., via the network, to a server 105, or server device. The server 105 may be for remote processing and/or storage of data, in relation to the devices 101-103, as will be discussed further below. The server 105 may be serving multiple devices, e.g. all of the devices 101-103. The server may correspond to a computer, or host computer, with server capabilities, or a cluster of such computers, and may be part of or correspond to a so called computer cloud, or simply cloud, providing server services.

As will be explained in further detail below, each of the devices 101-103, e.g. the device 101, may provide, e.g. by execution of software on the device 101, a virtual environment, or access to such e.g. provided by the server 105. The virtual environment simulating an environment relevant for operation of vehicle(s) having AD/ADAS functionality. The virtual environment may be provided by or through a software executing on the device 101, e.g. in the form of a computer program, e.g. a so called application or 'app', installable and executional on the device 101, e.g. corresponding to a simulator and/or computer game that may motivate a user of the device 101 and the software to virtually challenge vehicles equipped with AD/ADAS software with difficult to manage and/or risky scenarios.

It should be understood that the type of user devices mentioned above comprise user interfaces, respectively, that allow for different kind of user input and output to the device. The user interface may be of different types, including conventional types for interfacing a user, e.g. display, i.e. screen, that may be touch sensitive, a keyboard, action buttons and/or or sticks, such as on a game controller, loudspeaker, microphone e.g. with voice recognition etc.

Figure 2A:
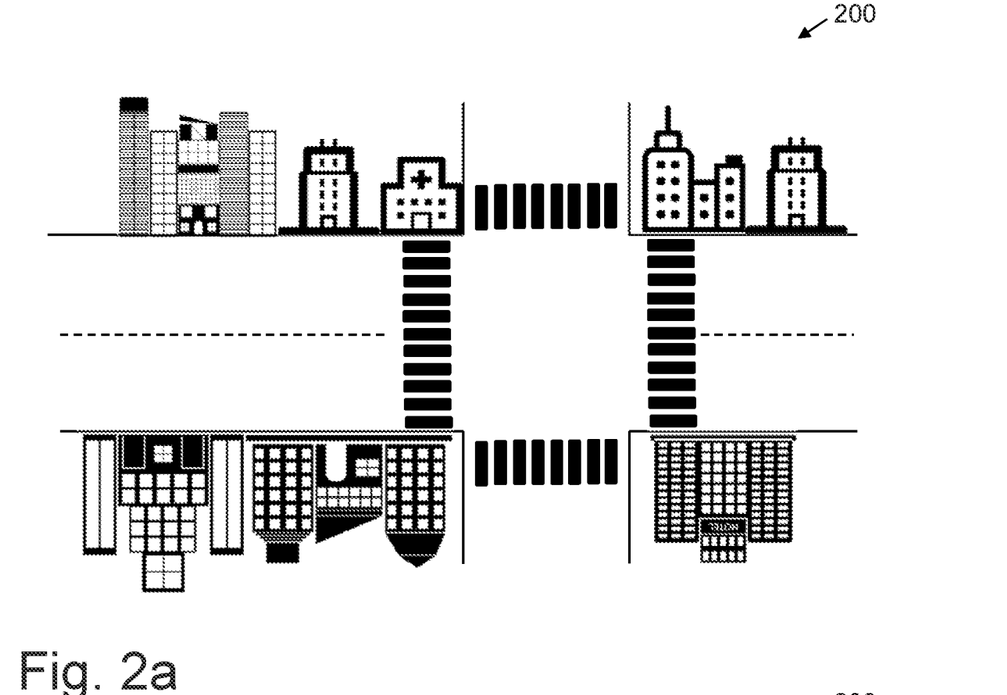
FIG. 2A schematically and in a simplified manner illustrates an example of a virtual environment to be used for exemplifying embodiments herein.

FIG. 2a schematically illustrates an example of such virtual environment mentioned above, here a virtual environment 200. As exemplified, the virtual environment 200 contains virtual infrastructure comprising roads for driving of virtual vehicles, e.g. virtual cars, and associated adjoining and nearby structures to the roads, e.g. in the form of buildings, cross-walks, sidewalks, traffic lights, etc.

Figure 2B:
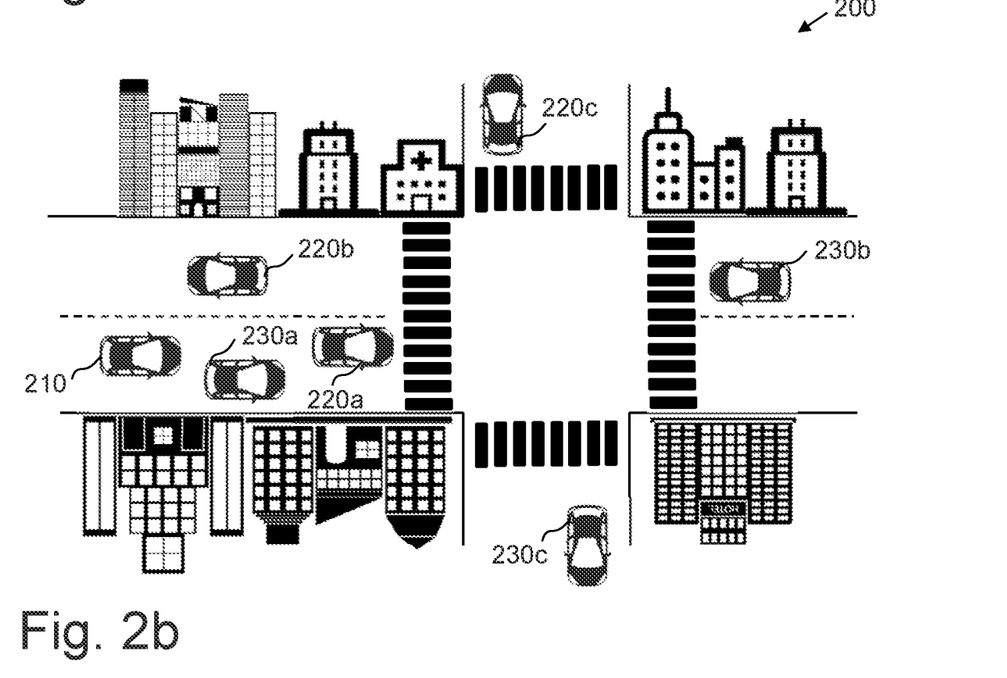
FIG. 2B schematically and in a simplified manner illustrates the virtual environment of FIG. 2A populated with different type of virtual vehicles for operation therein.

FIG. 2b illustrates the virtual environment 200 of FIG. 2a, now also populated with computer controlled movable virtual objects 230a-c, that may be exemplified as artificial intelligence (AI) controlled cars, a virtual AD/ADAS vehicle 210 that may be exemplified as an AV car, configured to operate in accordance with said AD/ADAS functionality and human controlled movable virtual objects 220a-c that may be exemplified as a human controlled, i.e. human driver (HD), cars. The objects and vehicles 210, 220a-c, 230a-c are operating and/or configured to operate in the virtual environment 200.

The virtual AD/ADAS vehicle 210 may execute and/or operate in accordance with at a particular version of AD/ADAS software that provides the AD/ADAS functionality.

The computer controlled movable virtual objects 230a-c may be fully or partly AI controlled, i.e. the behavior of these objects may be simulated by use of AI algorithms. The AI algorithms may range from complex supervised machine learning algorithms trained by real world data to reinforcement learning techniques which explore the simulation environment and/or may learn to challenge e.g. the virtual AD/ADAS vehicle 210. The computer controlled movable virtual objects 230a-c may e.g. include pedestrians, bikers, vehicles etc. The computer controlled movable virtual objects 230a-c may be all, or fully, computer controlled when operating, i.e. they may act and move without human control during operation in the virtual environment 200. Alternatively, they could be referred to as fully computer operated virtual objects or autonomous virtual vehicles. The fully computer controlled movable virtual objects 230a-c may thus operate autonomously from a human user. In a computer game context, they could correspond to so called non-player character (NPC).

Users of the devices 101-103 may e.g. via user interfaces of the devices, control the human controlled movable virtual objects 220a-c in the virtual environment 200 and thereby make one or more of these interact with and/or affect the virtual environment 200 as such, e.g. the infrastructure thereof, the computer controlled virtual objects 230a-c and/or the virtual AD/ADAS vehicle 210 and/or other human controlled movable virtual object(s). The interaction, or how the human controlled movable virtual object(s) affect the virtual environment 200 as such, other objects and/or vehicles operating therein, may directly or indirectly cause the AD/ADAS vehicle to be subjected to, i.e. exposed to and/or experiencing, various situations and scenarios when operating in the virtual environment 200. Note that it is not needed that a human, e.g. the user of the device 101, is in control of every aspect of a movable virtual object, e.g. the human controlled movable virtual object 220a, for it to be human controlled, but e.g. that the user control can control the object's moving behaviour in some respect and that this causes said affection and/or interaction during operation, and thus is a result from the user control. In general the human control may be in or near real time, or with some delay, during operation, and/or the control may be set or configured by human, e.g. the user of the device 101, prior to operation.

Human controlled movable virtual object(s) open up the opportunity for users to participate and efficiently act as testers regarding AD/ADAS functionality although this need not necessarily be in focus for the users, which instead may be to participate in a simulator and/or computer game. A user of a device, e.g. the device 101, may e.g. control the human controlled movable virtual object 220a as part of such simulator and/or computer game, and e.g. determine, such as select, at least part of the virtual environment 200 that the human controlled movable virtual object 220a will operate in, e.g. as part of configuration of the simulator and/or computer game that affects how the will operate in the virtual environment 200.

A user of a device, e.g. the device 101, may further load and/or affect behaviour of computer controlled movable virtual objects, e.g. 230a-c, such as AI road users, in the simulator and/or computer game, e.g. in order to set up a scenario where the goal is to expose the virtual AD/ALAS vehicle 210 to a situation or scenario of interest, e.g. corresponding to a corner case scenario.

As should be realized, existing software in the form of simulators and/or computer games that are provided through or by server(s) may be modified to provide a virtual environment as the virtual environment 200 and to implement embodiments herein, as described below.

Attention is drawn to that FIG. 1 and FIGS. 2A-B are only schematic and for exemplifying purpose and that not everything shown in the figures may be required for all embodiments herein, as should be evident to the skilled person. Further, in practice, there may of course be more devices, multiple servers, other, more complex virtual environments, etc. but which are not shown herein for the sake of simplifying. There may in practice e.g. be a much larger number of devices and respective users.

Figure 3:
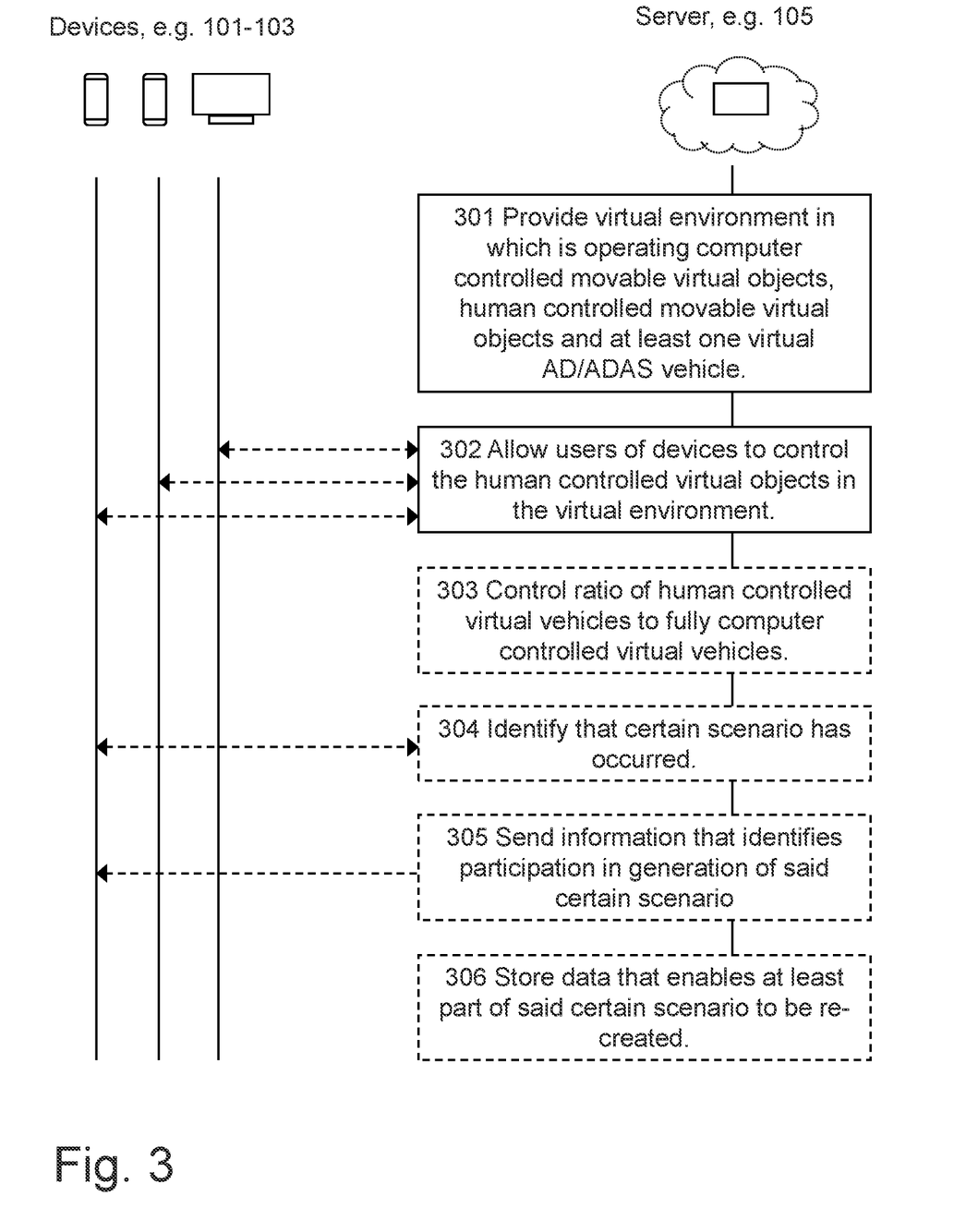
FIG. 3 is a flowchart schematically illustrating actions of a method according to embodiments herein.

FIG. 3 depicts a flowchart combined with a signaling diagram, which will be used to discuss embodiments herein.

The actions below, which may form a method, are for supporting generation of scenarios for testing autonomous driving and/or advanced driver assistance system, AD/ADAS, functionality for one or more real world vehicles. The actions are performed by a server, e.g. the server 105.

The actions below may be taken in any suitable order and/or be carried out fully or partly overlapping in time when this is possible and suitable.

Action 301

The server 105 provides a virtual environment, e.g. the virtual environment 200, simulating an environment relevant for operation of one or more vehicles, such as said real world vehicles, having said AD/ADAS functionality. In the virtual environment 200 it is operating: one or more fully computer controlled movable virtual objects, e.g. the computer controlled movable virtual objects 230a-c, one or more human controlled movable virtual objects, e.g. the human controlled movable virtual objects 220a-c and at least one virtual AD/ADAS vehicle, e.g. the virtual AD/ADAS vehicle 210, operating according to said AD/ADAS functionality.

The AD/ADAS functionality may fully or partly correspond to AD/ADAS functionality of, or associated with, a real world vehicle, or planned to be real world vehicle. As should be understood, "real world vehicle" as used herein, refers to a physical vehicle for operation in the real, physical world that humans are born and live in and interact directly with.

The computer controlled and/or human controlled movable virtual objects may e.g. correspond to or comprise vehicle(s), as discussed and illustrated in relation to FIG. 2A, and may additionally or alternatively comprise or be other object(s), such as virtual human(s), e.g. pedestrians, walking and/or running, with e.g. stroller(s), flying objects, such as drones, or thrown or falling objects, such as stones or trees, that can be moved by the user and placed e.g. on a road in the virtual environment, etc. As understood, the movable virtual objects may correspond to various kind of road users.

All or some of said one or more fully computer controlled movable virtual objects may advantageously operate with behavior that is unpredictable by implementation of said computer control. Thereby, repeated, predictable behavior can be avoided so that these objects do not perform repeatedly in the same way at different occasions when a software, e.g. game, implementing embodiments herein is being executed on a device operated by a user. To accomplish this the computer controlled movable virtual objects, or at least their behaviour, may be implemented based on AI algorithms and/or be implemented with some degree of randomized behavior. The former may have some further advantages where the algorithm can learn from previous occasions, e.g. that caused generation of certain, e.g. particularly interesting, scenarios, such as corner case scenarios, as described below. Machine learning algorithms may be used influence and promote behavior that increase the possibility for further, similar interesting scenarios to be generated. In any case, by avoiding repeated behavior there will be greater variation amongst generated scenarios and increased possibility of interesting scenarios, e.g. corner case scenarios, to be generated.

The human controlled movable virtual objects may be or comprise the virtual AD/ADAS vehicle, e.g. if not fully autonomous but at least partly human controlled, but can also be or comprise another vehicle or object.

In some embodiments, the one or more fully computer controlled movable virtual objects comprise one or more of said at least one virtual AD/ADAS vehicle, e.g. the virtual AD/ADAS vehicle 210, i.e. the AD/ADAS vehicle is then not user centric. In case the AD/ADAS functionality does not contain autonomous driving functionality, such functionality may be provided separately, e.g. may the AD/ADAS functionality be integrated in one of the fully computer controlled movable virtual objects in the form of a virtual vehicle, e.g. that has been configured to allow for this. See under action 303 below for further discussion and associated advantages.

Action 302

The server 105 allows devices, e.g. the devices 101-103, to remotely connect to the server 105 and users of the devices 101-103 to, via user interfaces of the devices 101-103, control said human controlled movable virtual objects 220a-c, respectively, in the virtual environment 200. Thereby it is caused generation of scenarios that one or more of said at least one virtual AD/ADAS vehicle 210 are subjected to and which scenarios are resulting from at least one of said one or more human controlled movable virtual objects 220a-c affecting one or more of the following: said one or more fully computer controlled movable virtual objects 230a-c, said at least one virtual AD/ADAS vehicle 210, and the virtual environment 200.

The scenarios above are thus caused by at least one user controlling a human controlled movable virtual object, e.g. any one of 220a-c, during operation. This cause interaction directly between this or these and the virtual AD/ADAS vehicle 210, or indirectly via the computer controlled movable virtual objects 230a-c, another human controlled movable virtual object, such as controlled by another user, and/or the virtual environment 200. Direct or indirect interaction with the virtual AD/ADAS vehicle 210 may include interaction with the AD/ADAS functionality of the virtual AD/ADAS vehicle.

As should be understood, a scenario that the virtual AD/ADAS vehicle 210 is subjected to corresponds herein generally to a series of events during a continuous time period. Further, as may be realized from the above, each scenario generated by embodiments herein should be initiated by, and may be considered to start with, an event where a user, by user input via a user interface of a device, controls at least one of the human controlled movable virtual objects and thereby causes it to affect one or more of the fully computer controlled movable virtual objects, said at least one virtual AD/ADAS vehicle, e.g. the virtual AD/ADAS vehicle 210, and/or the virtual environment 200, whereby this results in that the virtual AD/ADAS vehicle 210 becomes affected directly, or indirectly via a chain of further events. To determine whether the virtual AD/ADAS vehicle 210 is affected or not by human controlled movable object(s), it may be compared to a situation, e.g. assumed or simulated, in which there was no user control involved and thus no user induced event, and e.g. see if the virtual AD/ADAS vehicle and/or AD/ADAS functionality reacts and/or behaves differently. It should be realized that during a period of operation in the virtual environment 200, there will typically be multiple such scenarios generated, although not all will be of interest, and yet fewer will correspond to corner case scenarios. However, the greater amount of and the greater variation among generated scenarios, the greater the chance that scenarios of interest and corner case scenarios are generated. Multiple users on multiple devices, respectively, where the user of each device is controlling one or more human controlled movable virtual object in the virtual environment 200 together with fully computer controlled movable virtual objects also operating therein, will facilitate and support generation of such scenarios.

In case of multiple virtual AD/ADAS vehicles operating in the virtual environment 200, scenarios may be generated in relation to each virtual AD/ADAS vehicle separately and/or be evaluated separately. That is, the scenarios may be per virtual AD/ADAS vehicle and it is not needed that a generated scenario involve multiple virtual AD/ADAS vehicles. Said caused generation of scenarios may thus relate to any one of the multiple virtual ADADAS vehicles, or generally, to one or more of the multiple virtual AD/ADAS vehicles.

Further, as should be understood from the above, embodiments herein expose the virtual AD/ADAS vehicle to, and the scenarios are generated in a context of, mixed human and computer controlled movable virtual objects in a virtual environment.

Embodiments herein support and contribute to generation of scenarios that the AD/ADAS vehicle will be subjected to and that can be used for repeated testing of AD/ADAS functionality. A generated scenario can be considered to correspond to a test case that e.g. can be re-used. Embodiments herein may support generation of test cases comprising scenarios that can be considered closer to real world scenarios, and may also increase the possibility for corner case scenarios to be generated, compared to a situation with only computer controlled environment and behavior. This since humans and human behavior exist in the real world and influence thereof should be present also virtually, especially if the aim is to generate scenarios relevant for AD/ADAS functionality for real world vehicles. The human influence and unpredictability in control and behavior should enable greater variation in scenarios that can be generated. Human creativity can thereby also be better utilized, which is not easy to achieve in an all computer controlled context. More variation and creativity involved are believed to increase the possibility for corner cases, especially in the context of many contributing users, e.g. in a crowdsourcing context.

Note that in some embodiments, the provided virtual environment, e.g. 200, may at least partly be visualized to user(s) through a corresponding physical environment, and/or one or more of the virtual objects, such as vehicles, e.g. 220a, may at least partly be visualized to user(s) through corresponding physical objects, e.g. vehicles. For example, a user may through radio control and/or augmented reality (AR) on a device, e.g. the device 101, control and/or view a physical, e.g. radio controlled, vehicle in at least a partly physical environment corresponding to at least part of the virtual environment 200, instead of, only virtually in the virtual environment 200. In such embodiments, the physical manifestation of the virtual environment 200 and/or objects therein may be considered part of a user interface, i.e. how user(s) view and/or interact with the virtual environment and/or objects, e.g. vehicles, therein.

In some embodiments, said fully computer controlled movable virtual objects, e.g. 230a-c, comprise said at least one virtual AD/ADAS vehicle, e.g. 210. In other words, said one or more human controlled movable virtual objects, e.g. 220a-c, may exclude the virtual AD/ADAS vehicle 210 which thus is not controlled by the user, i.e. is not user centric. Such embodiments were indicated above under Action 301. An advantage is that this facilitate implementation of embodiment herein in or with existing softwares or software platforms, e.g. computer games, possibly in combination with associated hardware, and that may include computer controlled vehicles that are not necessarily user centric but instead for example may correspond to NPCs that the user may directly or indirectly affect and/or be affected by. If e.g. such existing software is adapted to include or make one or more computer controlled vehicles be furnished with, e.g., by push download to the software and/or hardware, AD/ADAS functionality and thereby become virtual AD/ADAS vehicle(s), this should facilitate both implementation of embodiments herein and achieving a crowdsourcing effect, thereby contributing to that more and more varying scenarios, including corner case scenarios, are being generated. For example, if said at least one AD/ADAS vehicle, or some AD/ADAS vehicle(s), is not controlled by user(s), there may be more AD/ADAS vehicles in operation than users, at the same time in the virtual environment 200 and the number of AD/ADAS vehicles need not scale with the number of users.

In embodiments herein implemented in or with existing softwares or software platforms, e.g. computer games, possibly in combination with associated hardware, involvement of AD/ADAS vehicle(s) and AD/ADAS functionality need even not be known to the user but e.g. agreed and implemented in cooperation with the provider of the computer game and generation of scenarios may follow as side effect when the user operate a character, corresponding to a human controlled movable virtual object, in a virtual environment of the computer game.

One or more of said at least one virtual AD/ADAS vehicle, e.g. the virtual AD/ADAS vehicle 210, may during operation in the virtual environment 200 be provided with a respective identifier that enables users of the devices 101-103 to, via user interfaces of the devices, identify such virtual AD/ADAS vehicle as being a certain type of virtual vehicle operating in the virtual environment 200.

This way the virtual AD/ADAS vehicle 210 can be identified by the users, e.g. as a virtual vehicle specifically targeted to generate scenarios in relation to. The identifier should hence enable the users to identify the virtual AD/ADAS vehicle as such and thus be able distinguish it from other similar vehicles that it else could be mixed up with, e.g. other vehicles corresponding to the human controlled movable virtual objects, e.g. 220*a-c*, and computer controlled movable virtual objects, e.g. 230*a-c*.

In some embodiments it may be implied to a user which vehicle is the AD/ADAS vehicle without having to provide it with an explicit identifier as above, e.g. when an AD/ADAS vehicle is a vehicle in which a user has a point of view, it may be implied to the user that this is an AD/ADAS vehicle and thus no need, at least not from the perspective of this user, with an explicit identification that this vehicle is an AD/ADAS vehicle. In some embodiments it may simply be so that AD/ADAS vehicle(s), just as a real world AV, has no visible driver and can be identified this way. However, in case of multiple other vehicles in the virtual environment 200, user induced generation of scenarios can be facilitated if it is, e.g. through said identifier, made easier to identify which vehicle is the AD/ADAS vehicle 210.

Action 303

As indicated, one or more of the human controlled movable virtual objects 220*a-c*, may be human controlled virtual vehicles, and one or more of the fully computer controlled virtual movable objects 230*a-c* may be fully computer controlled virtual vehicles. In such embodiments, the server 105 may control the ratio of human controlled virtual vehicles to fully computer controlled virtual vehicles operating in the virtual environment 200.

In other words, the control is of said ratio as such, i.e. it should be purposely controlled and not as a side effect. The control may be advantageously be accomplished by adding or removing fully computer controlled virtual vehicles from the virtual environment based on the number of human controlled virtual vehicles. It can of course also can be accomplished by, alternatively or additionally, controlling the number of human controlled virtual vehicles, e.g. the number of allowed such vehicles per user and/or controlling the number of remotely connected devices.

An all computer-controlled environment, even if based on data from behavior of real humans in real world situations and e.g. artificial intelligence to simulate human behaviors, must typically be based data collected over a very long time from a very large number of individuals to be able to generate behaviors similar to human behaviour. Such data is typically not available or would require a very long period and/or be very difficult to generate in the real world.

The amount of AD/ADAS vehicles, and in particular AVs, in traffic, this will affect human behavior in the traffic. It should be understood that this is particularly difficult to test in the real world and also in a fully computer controlled virtual environment. The mix of AD/ADAS vehicles, and AVs, and human controlled vehicles is in the real world expected to continuously change over time, in increasing favor for AD/ADAS vehicles and AVs. It is hence of great interest to be able to test in and be able to generate scenarios at different ratios between human controlled virtual vehicles and fully computer controlled virtual vehicles, before these ratios are present in the real world. For example, a certain ratio may be maintained over a period and scenarios be generated. In other words, said ratio may be controlled to be maintained at a certain level. The level may be predefined or predetermined and e.g. kept the same over a certain time period during which scenarios are generated. For example a desirable ratio may be set to a certain number or range and then the ratio be controlled so that the ratio is kept at this number or within the range.

For reasons indicated above, and to better simulate a real world situation where human drivers are typically capable of identifying AVs, it may be advantageous if users are able to distinguish fully computer controlled vehicles from human controlled vehicles in the virtual environment 200. Hence, to facilitate this, in some embodiments, one or more of the fully computer controlled movable virtual objects, e.g. 230*a-c*, are fully computer controlled virtual vehicles that during operation in the virtual environment 200 are provided with identifiers, respectively, that enables users of the devices 101-103 to, via user interfaces of the devices 101-103, identify that these are fully computer controlled. And/or, in some embodiments, one or more of the human controlled movable virtual objects, e.g. 220*a-c*, are vehicles that during operation in the virtual environment 200 are provided with identifiers, respectively, that enables the users to, via user interfaces of the devices (101-103), identify that these are human controlled.

Action 304

The server 105 may initiate identification, or identify, that a certain scenario has occurred. The identification may be based on data generated in relation to one or more of said at least one virtual AD/ADAS vehicle, e.g. the virtual AD/ADAS vehicle 210.

The certain scenario being identified should be a scenario of interest. The certain scenario may be a certain type or kind of scenario, and may be determined according to a predefined criteria and/or user input. It may e.g. be a new scenario compared to previous generated and/or stored scenarios. The certain scenario may be a scenario, or candidate scenario, for test case(s), and/or may be, or be a candidate for, a corner case scenario. Scenario of interest is further discussed below.

The data generated in relation to the AD/ADAS vehicle 210 may be data generated by, or in, a part of software relating to the AD/ADAS vehicle and/or a software providing the AD/ADAS functionality, and/or relating to another vehicle, object or infrastructure interacting with or in a predefined or predetermined proximity of the AD/ADAS vehicle.

Hence, in some embodiments, said data generated in relation to said one or more of said at least one virtual AD/ADAS vehicle, e.g. the virtual AD/ADAS vehicle 210, comprises data generated external from said one or more of said at least one virtual AD/ADAS vehicle, e.g. the virtual AD/ADAS vehicle 210. That is, data generated external from the virtual AD/ADAS vehicle(s) subjected to said certain scenario.

Also, as indicated below, externally generated data, e.g. perception data, may also be utilized for some functionally of the AD/ADAS vehicle 210 e.g. in case it is not desirable or possible to provide it with a full or complete AD/ADAS functionality as in a real vehicle. That is, instead of simulating real world sensors providing data to the AD/ADAS functionality when in a real world vehicle, i.e. to the AD/ADAS functionality to operate upon, such data may instead be provided by, e.g. be extracted from within, the device executing a software implementing embodiments herein and for example be based on how the AD/ADAS vehicle, e.g. its boundaries, position and/or velocity, relate to the virtual environment and other, e.g. moving, objects therein.

The identification as such may be performed by the server 105 and/or be fully or partly performed by a device, e.g. the device 101, involved in generation of the certain scenario, with or without participation of the user. When the device is involved, data may be communicated to/from the device, e.g. 101. In some embodiments, the identification may involve remote processing, e.g. that data is communicated to/from another server that assists in or performs the identification.

In some embodiments a device, e.g. the device 101, may initiate identification, e.g. through user participation via a user interface of the device 101, such as exemplified below, and then reporting and communicating information about this to the server 105 that then may initiate and/or perform the actual identification based on data on the server 105, e.g. temporally stored. The server 105 may evaluate and e.g. rate such candidate scenario in comparison with other scenarios that previously have been generated, evaluated and/or stored.

For example, the identification may be based that the software providing the AD/ADAS functionality, when executed on the server 105 or on the device 101, signals that it could not handle a situation as it should or that a problematic event, e.g. collision, has occurred, and/or that some part of software monitors what the involved AD/ADAS vehicle is being caused and/or is causing when interacting with other vehicles, objects and infrastructure in the virtual environment, and generate data identifying certain events, e.g. a collision. The identification may further be based on a predefined criteria that e.g. may comprise occurrence of such certain event and/or occurrence of certain signal from the software providing the AD/ADAS functionality. In some embodiments the predefined criteria may comprise comparing the generated data to previously stored scenarios in and see if it is sufficiently different in one or more respects and thereby be, or potentially be, of interest.

As already indicated above, the identification may be based on user input via said user interface. User input for scenario identification may be part of information being used to identify scenarios of interest. There may e.g. be a replay presented to a user via a user interface of the device 101, e.g. replay over a period during which the user has controlled the human controlled movable virtual object 220a in the virtual environment 200 and thereby may have directly or indirectly affected the virtual AD/ADAS vehicle 210. The user may then e.g. be allowed to, via the user interface, mark, e.g. by selecting times stamps, scenario(s) that the user considers to be of interest. Another option is that the server 105 suggests scenario candidates to the user via the user interface, which candidates the user then may, via the user interface, review and thereafter select and/or rate scenario(s) that the user considers to be of interest, if any. The result may then be communicated to the server 105 for further evaluation and/or storage.

To sum up, the identification of said certain scenario may be based on scenario identifying information received from one or more of said devices 101-103.

Using input from uses of the devices, e.g. the user of the device 101, for identification of scenarios, particularly if it is based on input from user(s) involved in causing the scenarios, has a number of advantages, in particular for identification of corner case scenarios. The user is the one that best knows what he/she has done and identify scenarios that "stand out" for some reason, which often may be the case for corner case scenarios. As explained, these scenarios are often rare and of rather unique nature, which may make it difficult to identify many such scenarios automatically.

Identification of certain scenarios among a larger amount of scenarios, with or without user input should further result in a reduced number of scenarios for storage, at least long time storage, and/or for further evaluation or identification, automatically and/or manually, e.g. on the server 105.

Action 305

The server 105 may send, to a device, e.g. the device 101, information that identifies participation in generation of said certain scenario. The device should be one that was used to control a human controlled movable virtual object, e.g. 220a, and thereby caused generation of said certain scenario.

The device 101 may receive this information and then e.g. provide, via its user interface and in response to the received information, a notification directed to the user about participation in generation of said certain scenario. That is, the user may via the user interface be notified about his/her participation in generation of a certain scenario that has been identified, e.g. a scenario of particular interest, such as a corner case scenario.

As should be understood, the identification as such may have been performed by the device 101, with or without involvement of the user, and/or by the server 105.

Feedback like this to the user support further similar behavior by the user, which behaviour e.g. resulted in an identified corner case scenario. It also enables gamification regarding the scenario generation, where the user in association with the feedback can be rewarded. There may e.g. be a rating and/or points rewarded to users and that relate to the number of identified certain scenarios, e.g. scenarios identified as being of interest, that the user has been involved in generating. The reward may also be based on classification of scenarios, where some classes are better rewarded. For example, if a scenario belongs to a class or type of scenario that is regarded a corner case and/or more likely to occur in the real world, it may be rewarded to a greater extent. Scenarios where the user has been involved in creation of the virtual environment relating to the scenario may belong to a certain class that also may be rewarded to a greater extent. This enables to affect the number of scenarios occurring for certain classes or types of scenarios and thereby to influence the possibility for scenarios of interest to be generated and/or scenarios of certain desirable classes or types to be generated.

Action 306

The server 105 may store data that enables at least part of said certain scenario to be re-created. Thereby the same or another virtual AD/ADAS vehicle is enabled to be subjected to said at least part of said certain scenario at another occasion.

At least part of said certain scenario means that said certain scenario can be partly or fully re-created, e.g. a part of it that is considered sufficient for a test case and/or some testing purpose.

The re-creation of the scenario, e.g. corresponding to a test case, enables repeated or further testing of AD/ADAS functionality by re-using the scenario. The re-created scenario may be used to subject the same or another AD/ADAS vehicle with the same or another, e.g. updated, AD/ADAS functionality, to the scenario, e.g. corresponding to a corner case scenario. A scenario of interest for testing a particular AD/ADAS functionality is typically of interest for testing this and similar or related AD/ADAS functionality also when provided by another software and/or when related to another vehicle. Storing of data that allows for re-creation and thus reuse of the scenario may thus be more valuable than data relating to the behavior of the functionality, e.g. testing of the AD/ADAS functionality as such.

It should be realized that embodiments herein, in addition to supporting generation of scenarios for testing AD/ADAS functionality at the same time can test, and generate data relating to, the functionality as such that is implemented by the virtual AD/ADAS vehicle.

It is further within the capacity of the skilled person, e.g. programmer providing a software implementing embodiment herein and for execution on a device to identify and if required generate data to be stored and that allows for said re-creation.

Note that the present action, or in general storage of scenario data, such as data enabling recreation of at least part of the scenario, may be performed in response to identification that a scenario of interest has occurred and be regarding the identified scenario of interest, i.e. may be in response to Action 304. It may suffice and be beneficial to only store data for recreation of scenarios of interest. In some embodiments however, the scenario data may first be at least temporally stored and then it is determined, e.g. involving comparison with other stored scenario data, whether to delete or keep the stored scenario data, e.g. in case it thereby is identified to be of interest. In these embodiments the storing may be remotely from the device, e.g. on a remote server, such as the server 105. Also the identification that a scenario is a scenario of interest may in these cases be fully or partly performed remotely, e.g. on the server 105.

As should be realized, embodiments herein provide the opportunity to test and use AD/ADAS functionality of vehicles using e.g. a simulation platform, and on different levels. The perhaps simplest and probably the most straightforward level is to equip a virtual AD/ADAS vehicle, e.g., the virtual AD/ADAS vehicle 210 with decision and control algorithms to test various functionalities, e.g. ADAS functionality, such as automated emergency brake (AEB) system or adaptive cruise control (ACC), etc. In this level, the virtual AD/ADAS vehicle does not need to be equipped with sensing, such as perception, systems, since the information describing this, e.g. regarding surroundings, such as other road users and infrastructure, distances, relative speed, etc may be extracted from and/or within the virtual environment, or rather from within a software executing on the device, e.g. software implementing embodiments and providing the virtual environment etc.

It should be realized that AD/ADAS software companies thereby have the opportunity to test different dimensionalities of e.g. a software in the virtual environment and that equips a virtual AD/ADAS vehicle with certain AD/ADAS functionality. For instance, in case it is desirable to test or validate perception algorithms, such algorithms may be plugged in, i.e. loaded into, the virtual AD/ADAS vehicle 210.

Embodiments herein also enable to deploy several versions of the same AD/ADAS functionality, e.g. provided by different AD/ADAS software, in the same virtual environment, e.g. in the virtual environment 200 on the server 105, If e.g. the virtual environment is part of a simulator and/or computer game software as discussed above, different versions of the AD/ADAS functionality may be pushed to a server executing the simulator and/or computer game, corresponding to the server 105, and be used in different AD/ADAS vehicles operating in the simulator and/or game in a virtual environment corresponding to the virtual environment 200.

Load and/or configure AD/ADAS functionality as above, or in general, of AD/ADAS vehicles, e.g. in the form of code implementing it, may be accomplished with or without users being aware and/or explicitly informed about it. It may e.g. be accomplished on the server 105 only and/or through download, e.g. push download, to device(s) by the server 105, e.g. during and/or as part of Action 301, Whether or not download should be performed to device(s) or not, or if it suffice to involve only the server 105, may be implementation specific and e.g. depend on how a simulator and/or computer game software that embodiments herein may be integrated with, is implemented.

Hence, said at least one virtual AD/ADAS vehicle, e.g. 210, are in some embodiments multiple virtual AD/ADAS vehicles. These may be configured to operate in accordance with different implementations of said AD/ADAS functionality, respectively. The different implementations may correspond to different versions of a software providing the AD/ADAS functionality. In these embodiments said AD/ADAS functionality may thus be the same, or substantially the same, for each of said multiple virtual AD/ADAS vehicles.

As indicated above, an advantage is e.g. that different software version can be used and/or tested at the same time in the virtual environment 200, and data and/or results be compared. This also increases the effect from each user or device, and the crowdsourcing effect further increases, since each user or device contributes to more exposure of AD/ADAS vehicles to scenarios testing AD/ADAS functionality.

Further, in some embodiments, said at least one virtual AD/ADAS vehicle, e.g. 210, are multiple virtual AD/ADAS vehicles configured to operate in accordance with different sub-functionalities, respectively, of said AD/ADAS functionality. The AD/ADAS functionality thus comprise different sub-functionalities in these embodiments. In general, AD/ADAS functionality, as used herein, may comprise several sub-functionalities. For example, in these embodiments, one or more of multiple virtual AD/ADAS vehicles may implement e.g. an ADAS functionality, such as AEB, and other one or more of the multiple virtual AD/ADAS vehicles may implement e.g., AD functionality. This increases flexibility and versatility of embodiment herein and increases the possibility that scenarios of interest are generated. Functionalities may be tested in relation to each other in the virtual environment and how they may affect each other. This may also be exploited to increase the change that scenarios of interest are generated.

As already indicated, embodiments herein and as discussed above, support or even promote generation of scenarios, including so-called corner case scenarios, that it may be of interest to subject the AD/ADAS vehicle 210 to, and also other vehicles with AD/ADAS functionality. For example, by being in a virtual environment, a (human) user will be less reluctant than in the real world to cause potentially harmful or dangerous scenarios and hence this increases the probability for such scenarios to be generated, i.e. scenarios that may be important to test and correspond to corner case scenarios, which are difficult and, often, desirable to avoid in the real world for apparent reasons. As explained above, the corner case scenarios are scenarios which in the real world typically occur so seldom that e.g. existing test fleets require to drive tens or hundreds of years in order to be exposed to such scenarios. In an all computer-controlled environment with objects trained based on a data set which typically does not include rare safety critical behavior, the interaction of computer-controlled objects with AVs may eventually generate some combinatorial interesting test scenarios, but it may not able to generate corner case scenarios that can occur in the real world. This is due to the fact that computer-controlled objects can only behave based on training dataset which does not include information about or behind corner case scenarios. Thus, augmenting an all computer-controlled environment with human-controlled objects as in embodiments herein provides the opportunity to expose AD/ADAS vehicles and computer-controlled objects with behaviors lying outside the domain of what conventional training dataset can accomplish in an all computer-controlled environment.

Additionally it should be appreciated that the mix of computer-controlled vehicles and human controlled movable objects as in embodiments herein may enable generation of scenarios that at least in some respect are closer to real world scenarios with human interaction than what is possible to generate in a conventional virtual testing environment that is only computer controlled. An all computer-controlled environment, even if based on data from behavior of real humans in real world situations and e.g. artificial intelligence to simulate human behaviors, must typically be based data collected over a very long time from a very large number of individuals to be able to generate behaviors similar to human behaviour. Such data is typically not available or would require a very long period and/or be very difficult to generate in the real world. And even if this would be attempted, the mix of AD/ADAS vehicles and human controlled vehicles is in the real world expected to continuously change over time, in increasing favor for AD/ADAS vehicles and the ratio, i.e. how common AD/ADAS vehicles are, will affect human behavior in traffic, as already mentioned above. Scenarios taking into account human behavior in a situation with higher number of AD/ADAS vehicles than currently available in the real world cannot rely on real world data but can be generated thanks to embodiments herein.

Moreover, as indicated in the foregoing, embodiments herein allows for comparatively simple implementation in and/or co-implementation with other, e.g. already existing, virtual environment platforms or programs, such as relating to simulators, e.g. vehicle simulators, and/or computer games, in particular network based gaming platforms. In other words, embodiments herein facilitate implementation in different contexts, in different virtual environments and/or on different type of devices. This in turn enables attraction of more and different users to carry out the method. The more people involved, the more different and varying situations and scenarios, and thereby greater possibilities for valuable scenarios, such as corner case scenarios, to be generated.

Hence, embodiments herein facilitate crowdsourced generation of scenarios for testing for AD/ADAS functionality.

Further, embodiments herein should not only enable the companies developing software providing the AD/ADAS functionality to accelerate evaluation of their software, but also substantially reduce costs by reducing the number of miles of human supervised road testing needed for verification of AVs.

To sum up, embodiments herein provide improvements regarding testing of AD/ADAS functionality in vehicles.

Figure 4:
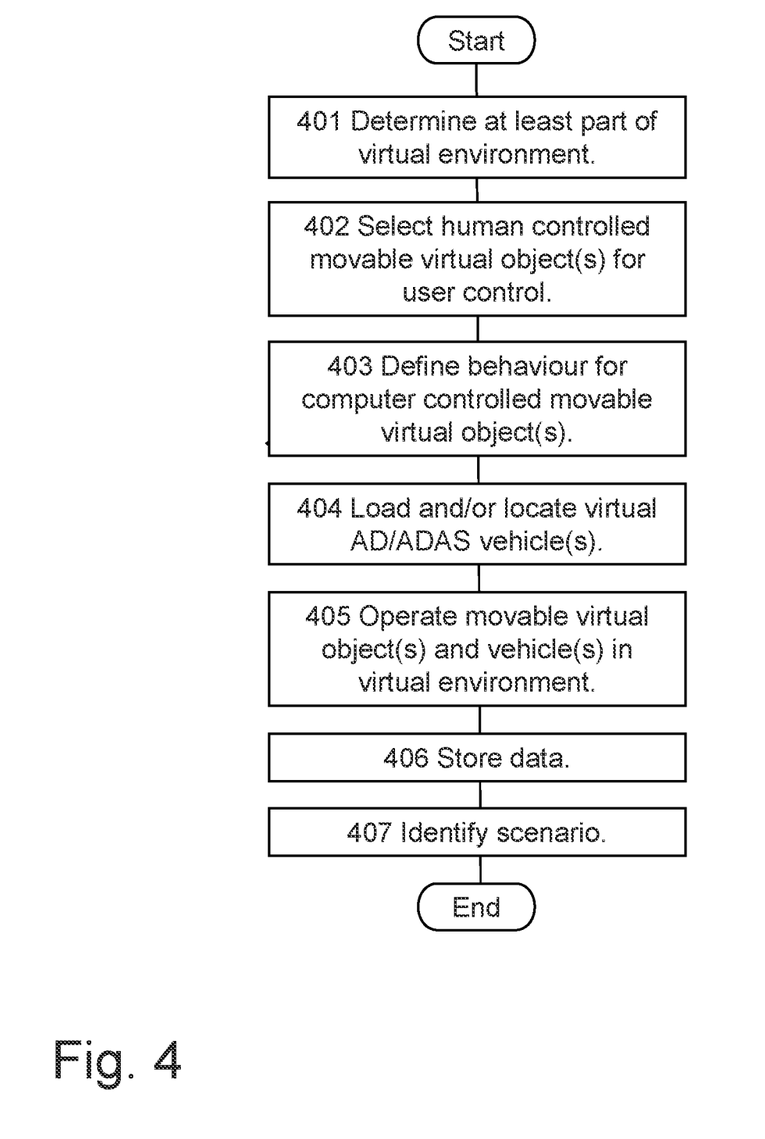
FIG. 4 is another flowchart schematically illustrating some actions relating to embodiments herein.

FIG. 4 is flow chart to further discuss and exemplify embodiments herein from a more user centric perspective, where the user here is exemplified as the user of device 101.

The actions may be taken in any suitable order and/or be carried out fully or partly overlapping in time when this is possible and suitable.

Action 401

The user may, via a user interface of the device 101, determine at least part of the virtual environment 200, e.g. select among alternatives available on the server 105.

This action may fully or partly correspond to action 301 above and may result in what is schematically illustrated and exemplified in FIG. 2A.

Action 402

The user may, via a user interface of the device 101, select one or more human controlled movable virtual objects, e.g. the human controlled movable virtual object 220a, for control by the user when it operates, i.e. during operation, in the virtual environment 200, e.g. as part of a simulator and/or computer game executing on the server 105 and a client part thereof executing on the device 101.

This action may partly correspond to actions 301 and 302 above.

Action 403

The user may, via a user interface of the device 101, define behaviour for some computer controlled movable virtual object(s), e.g. the computer controlled movable virtual objects 230a-c, which behavior relates to how they shall or should operate in the virtual environment 200, e.g. as part of a simulator and/or computer game executing on the server 105 and a client part thereof executing on the device.

Note that when the user define behaviour for computer controlled movable virtual object, and the result is that the user thereby in fact controls the object in the virtual environment, such object may be considered both human controlled and computer controlled, although it may be fully computer controlled during operation.

This action may partly correspond to actions 301 and 303 above.

Action 404

The user may, via a user interface of the device 101, load and/or locate virtual AD/ADAS vehicle(s), e.g. the virtual AD/ADAS vehicle 210, to operate in the virtual environment 200, for example as part of a simulator and/or computer game executing on server 105 and a client part thereof executing on the device 101. As indicated previously, such AD/ADAS vehicle may at the same time be a computer controlled virtual vehicle or a human controlled virtual vehicle.

This action may partly correspond to action 301 above.

Actions 402-404 may result in what is schematically illustrated and exemplified in FIG. 2B.

Actions 401-404 provides opportunity for users to mimic or even recreate, or be inspired by, challenging or risky scenarios that vehicles have encountered in the real world and possibly even make those even more challenging. This may include the virtual environment as such in Action 401, and/or e.g. road users as in Action 402-404, e.g. pedestrians, vehicles and AV(s) both with and without AI support, e.g. control in Actions 402-404 that may be fully or partly based on AI algorithms. For example, a user may define and/or control behaviour of some road user(s) and leave other to be fully or partly be controlled by AI algorithms and/or other users.

Action 405

Based on actions 401-404, the movable virtual object(s) and vehicle(s) may operate in the virtual environment, e.g. the computer controlled movable virtual objects 230a-c, the human controlled movable virtual objects 220a-c and the virtual AD/ADAS vehicle 210 may operate in the virtual environment 200. As mentioned above, the operation may be part of a simulator and/or computer game executing on the server 105.

This action may partly correspond to action 301 above.

Action 406

During operation in the virtual environment, e.g. during action 405, the server 105 and/or device(s), e.g. 101, may store data, which may be referred to as data logging. The data may relate to behavior of the virtual AD/ADAS vehicle(s), e.g. the virtual AD/ADAS vehicle 210, and/or to data that enables generated scenario(s) to be partly or fully re-created. The scenarios) being such the AD/ADAS vehicle(s) is subjected to during operation that may be part of a simulator and/or computer game executing on the server 105 and a client part thereof executing on the device 101. The storage may thus be locally on e.g. the device 101 and/or remotely, e.g. on the server 105.

This action may partly correspond to action 305 above.

Action 407

During or after operation in the virtual environment, e.g. during or after action 405, one or more scenarios may be identified. The identification may be made from stored data resulting from action 406. Although real time or close to real time identification may be possible, e.g. based on temporally stored data in fast access memory, it may be preferred to store data in action 406 during a longer period of operation, or as long as possible or suitable based on storing capabilities, and thereafter, e.g. after action 405, identify the scenarios from the stored data. Scenarios, or part(s) thereof, that are identified and considered to be of interest, may then be kept, e.g. stored more permanently, which may involve moving data relating to such scenario from temporal storage, e.g. locally, to more permanent or long time storage for further use of the data, e.g. on the server 105 or at some other location. Hence storage in action 406, may, at least in some embodiments, be in response to the present action.

This action may fully or partly correspond to action 304 above.

The user mentioned above may e.g. be or correspond to a crowdsourced user that may act as tester and e.g. through actions 401-404 may have possibility to set up or opt, plan, or at least participate in a traffic situation or traffic scenario that will or may result in a scenario during operation in the virtual environment in action 405. The scenario may thereafter be identified and related data be stored as in actions 406-407.

A user may utilize embodiments herein to cause a risky or potentially risky situation or scenario for the AD/ADAS vehicle(s), e.g. the virtual AD/ADAS vehicle 210, to thereby challenge or test its behaviour in such scenario.

Even without performance of one or more of actions 401-404, e.g. in case of a predefined or predetermined virtual environment 200 and/or computer controlled movable virtual object(s) and/or human controlled movable virtual objects 220a-c and/or virtual AD/ADAS vehicle, action 405 and 406 and embodiments herein may still be useful. If performance is involving many devices and many users in a crowdsourced fashion, valuable data corresponding to many miles of driving may be provided and/or stored and increase possibility that scenarios of interest, e.g. corner case scenarios, are produced, identified and stored.

Note that although embodiments herein may be particularly suitable to produce e.g. corner case scenarios that may be re-created and reused in test cases, they may also be used for testing a particular AD/ADAS functionality as such, in addition to e.g. conventional real world test driving and testing in an all computer controlled and simulated context.

Figure 5:
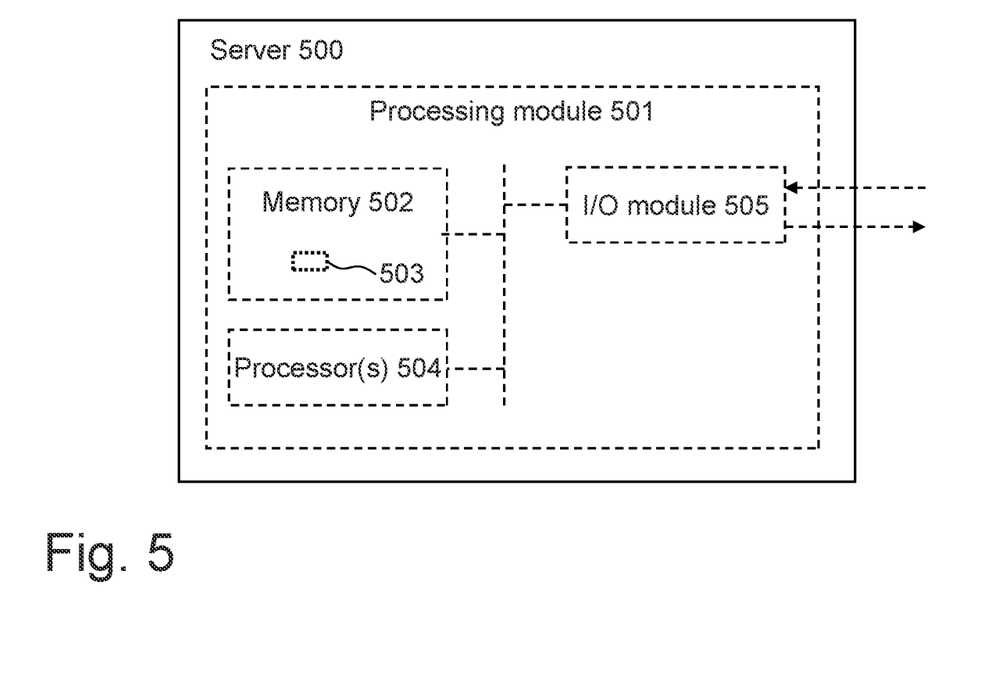
FIG. 5 is a functional block diagram for illustrating embodiments of a server according to embodiments herein and how it can be configured to carry out the method and actions described in relation to FIG. 3.

FIG. 5 is a schematic block diagram for illustrating embodiments of a server 500 that may correspond to the server 105. The schematic block diagram is also for illustrating embodiments of how the server 500, e.g. the server 105, may be configured to perform the method and actions discussed above in relation to FIG. 3.

Hence, the server 500 is for supporting generation of scenarios for testing autonomous driving and/or advanced driver assistance system, AD/ADAS, functionality for one or more real world vehicles.

The server 500 may comprise a processing module 501, such as a means, one or more hardware modules, including e.g. one or more processors, and/or one or more software modules for performing said method and/or actions.

The server 500 may further comprise memory 502 that may comprise, such as contain or store, a computer program 503. The computer program 503 comprises 'instructions' or 'code' directly or indirectly executable by the server 500 to perform said method and/or actions. The memory 502 may comprise one or more memory units and may further be arranged to store data, such as configurations and/or applications involved in or for performing functions and actions of embodiments herein.

Moreover, the server 500 may comprise processor(s) 504, i.e. one or more processors, as exemplifying hardware module(s) and may comprise or correspond to one or more processing circuits. In some embodiments, the processing module(s) 501 may comprise, e.g. 'be embodied in the form of' or 'realized by' processor(s) 504. In these embodiments, the memory 502 may comprise the computer program 503 executable by the processor(s) 504, whereby the server 500 is operative, or configured, to perform said method and/or actions thereof.

Typically the server 500, e.g. the processing module(s) 501, comprises Input/Output (I/O) module(s) 505, configured to be involved in, e.g. by performing, any communication to and/or from other units and/or devices, such as sending and/or receiving information to and/or from the devices 101-103. The I/O module(s) 505 may be exemplified by obtaining, e.g. receiving, module(s) and/or providing, e.g. sending, module(s), when applicable.

The server 500 may further comprise a user interface, that may be integrated with the server 500 and/or be communicatively connected to it. The user interface may allow for different kind of management actions, e.g. various kind of control and configuration, via input and output to/from the server 500. The user interface may as such be of a conventional type for interfacing a server.

Further, in some embodiments, the server 500, e.g. the processing module(s) 501, comprises one or more of providing module(s), allowing module(s), storing module(s), and initiating module(s), controlling module(s) and sending module(s), as exemplifying hardware and/or software module(s) for carrying out actions of embodiments herein. These modules may be fully or partly implemented by the processor(s) 504.

The server 500, and/or the processing module(s) 501, and/or the processor(s) 504, and/or the I/O module(s) 505, and/or the providing module(s) may thus be operative, or configured, to provide said virtual environment, e.g. the virtual environment 200, simulating said environment relevant for operation of said one or more vehicles having said AD/ADAS functionality and in which virtual environment it is operating said: said one or more computer controlled movable virtual objects, e.g. 230a-c, said one or more human controlled movable virtual objects, e.g. 220a-c, and said at least one virtual AD/ADAS vehicle, e.g. 210, operating according to said AD/ADAS functionality.

Further, the server 500, and/or the processing module(s) 501, and/or the processor(s) 504, and/or the I/O module(s)

505, and/or the allowing module(s) may be operative, or configured, to allow said devices, e.g. devices 101-103, to remotely connect to the server 500 and said users of said devices to, via said user interfaces of the devices, to control said human controlled movable virtual objects 220a-c, respectively, during said operation in the virtual environment 200 and thereby cause said generation of scenarios that one or more of said at least one virtual AD/ADAS vehicle, e.g. the virtual AD/ADAS vehicle 210, is subjected to. The scenarios resulting from at least one of the human controlled movable virtual objects 220a-c affecting one or more of the following: said one or more fully computer controlled movable virtual objects 230a-c, said at least one virtual AD/ADAS vehicle 210, the virtual environment 200.

Moreover, the server 500, and/or the processing module(s) 501, and/or the processor(s) 504, and/or the I/O module(s) 505, and/or the initiating module(s) may be operative, or configured, to initiate said identification that said certain scenario has occurred.

The server 500, and/or the processing module(s) 501, and/or the processor(s) 504, and/or the I/O module(s) 505 and/or the sending module(s) may be further operative, or configured, to send to said device, e.g. 101, that was used to control said human controlled movable virtual object, e.g. 220a, and thereby caused generation of said certain scenario, said information that identifies participation in generation of said certain scenario.

In some embodiments, the server 500, and/or the processing module(s) 501, and/or the processor(s) 504, and/or the I/O module(s) 505 and/or the controlling module(s) are further operative, or configured, to control said ratio of human controlled virtual vehicles to fully computer controlled virtual vehicles operating in the virtual environment 200.

Also, the server 500, and/or the processing module(s) 501, and/or the processor(s) 504, and/or the I/O module(s) 505, and/or the storing module(s) may be operative, or configured to store said data that enables said at least part of said certain scenario to be re-created.

Figure 6:
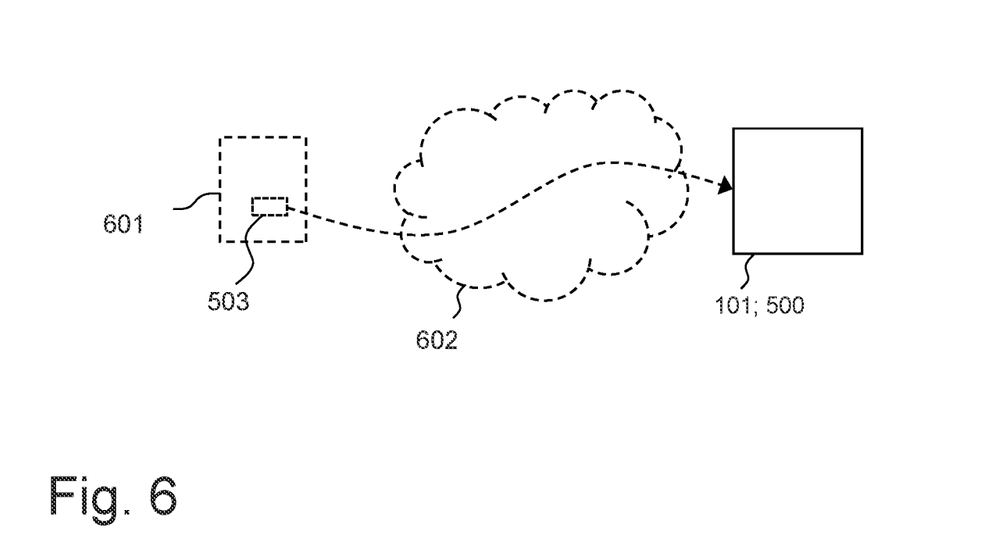
FIG. 6 is a schematic drawing illustrating embodiments relating to a computer program, and carriers thereof, to cause the device to perform the method and actions described in relation to FIG. 3.

FIG. 6 is a schematic drawing illustrating some embodiments relating to computer program and carriers thereof to cause said server 500 discussed above to perform said method and actions. The computer program may be the computer program 503 and comprises instructions that when executed by the processor(s) 504 and/or the processing module(s) 501, cause the server 500 to perform as described above. In some embodiments there is provided a carrier, or more specifically a data carrier, e.g. a computer program product, comprising the computer program. The carrier may be one of an electronic signal, an optical signal, a radio signal, and a computer readable storage medium, e.g. a computer readable storage medium 601 as schematically illustrated in the figure. The computer program 503 may thus be stored on the computer readable storage medium 601. By carrier may be excluded a transitory, propagating signal and the data carrier may correspondingly be named non-transitory data carrier. Non-limiting examples of the data carrier being a computer readable storage medium is a memory card or a memory stick, a disc storage medium such as a CD or DVD, or a mass storage device that typically is based on hard drive(s) or Solid State Drive(s) (SSD). The computer readable storage medium 601 may be used for storing data accessible over a computer network 602, e.g. the Internet or a Local Area Network (LAN). The computer program 503 may furthermore be provided as pure computer program(s) or comprised in a file or files. The file or files may be stored on the computer readable storage medium 601 and e.g. available through download e.g. over the computer network 602 as indicated in the figure, e.g. via a server. The server may e.g. be a web or File Transfer Protocol (FTP) server. The file or files may e.g. be executable files for direct or indirect download to and execution on said first node to make it perform as described above, e.g. by execution by the processor(s) 504. The file or files may also or alternatively be for intermediate download and compilation involving the same or another processor(s) to make them executable before further download and execution causing said server 500 to perform as described above.

Note that any processing module(s) and circuit(s) mentioned in the foregoing may be implemented as a software and/or hardware module, e.g. in existing hardware.

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in a device, server, or system or at least in a relevant part or area thereof.

Also note that although terminology used herein may be particularly associated with and/or exemplified by certain communication systems or networks, this should as such not be seen as limiting the scope of the embodiments herein to only such certain systems or networks etc.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

Also note that any enumerating terminology such as first device, second device, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a device and/or processing circuit or module is configured to, or adapted to, by means of software and/or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

We claim:

1. A method performed by a server (105; 500), for supporting generation of scenarios for testing autonomous driving and/or advanced driver assistance system, AD/ADAS, functionality for one or more real world vehicles, wherein the method comprises:
providing (301) a virtual environment (200) simulating an environment relevant for operation of one or more vehicles having said AD/ADAS functionality and in which the virtual environment (200) it is operating: one or more fully computer controlled movable virtual objects (230a-c), one or more human controlled movable virtual objects (220a-c), and at least one virtual AD/ADAS vehicle (210) operating according to said AD/ADAS functionality, and
allowing (302) devices (101-103) to remotely connect to the server (105; 500) and users of said devices (101-103) to, via user interfaces of the devices (101-103), control said human controlled movable virtual objects (220a-c), respectively, in the virtual environment (200), and thereby cause generation of scenarios that one or more of said at least one virtual AD/ADAS vehicle (210) are subjected to and which scenarios are resulting from at least one of said one or more human controlled movable virtual objects (220a-c) affecting one or more of the following: said one or more fully computer controlled movable virtual objects (230a-c), said at least one virtual AD/ADAS vehicle (210), and the virtual environment (200).

2. The method according to claim 1, wherein the method further comprises:
initiating identification (304) that a certain scenario has occurred.

3. The method according to claim 2, wherein the identification is based on data generated in relation to one or more of said at least one virtual AD/ADAS vehicle (210).

4. The method according to claim 3, wherein said data generated in relation to the one or more of said at least one virtual AD/ADAS vehicle (210) comprise data generated external from the one or more of said at least one virtual AD/ADAS vehicle (210).

5. The method according to claim 2, wherein the identification is based on scenario identifying information received from one or more of said devices (101-103).

6. The method according to claim 2, wherein the method further comprises:
sending (305), to a device (101) that was used to control a human controlled movable virtual object (220a) and thereby caused generation of said certain scenario, information that identifies participation in generation of said certain scenario.

7. The method according to claim 1, wherein the method further comprises:
storing (306) data that enables at least part of said certain scenario to be re-created and thereby enable the same or another virtual AD/ADAS vehicle (210) to be subjected to said at least part of said certain scenario at another occasion.

8. The method according to claim 1, wherein said fully computer controlled movable virtual objects (230a-c) comprise said at least one virtual AD/ADAS vehicle (210).

9. The method according to claim 1, wherein one or more of said at least one virtual AD/ADAS vehicle (210), during operation in the virtual environment (200), is provided with a respective identifier that enables the users of the devices (101-103) to, via user interfaces of the devices (101-103), identify such virtual AD/ADAS vehicle as being a certain type of virtual vehicle operating in the virtual environment (200).

10. The method according to claim 1, wherein one or more of the fully computer controlled movable virtual objects (230a-c) are fully computer controlled virtual vehicles that during operation in the virtual environment (200) are provided with identifiers, respectively, that enables the users of the devices (101-103) to, via user interfaces of the devices (101-103), identify that these are fully computer controlled, and/or wherein one or more of the human controlled movable virtual objects (220a-c) are human controlled movable virtual vehicles that during operation in the virtual environment (200) are provided with identifiers, respectively, that enables the users to, via user interfaces of the devices (101-103), identify that these are human controlled.

11. The method according to claim 1, wherein one or more of the human controlled movable virtual objects (220a-c) are human controlled virtual vehicles (220a-c), and one or more of the fully computer controlled virtual movable objects (230a-c) are fully computer controlled virtual vehicles (230a-c), and wherein the method further comprises:
controlling (303) a ratio of human controlled virtual vehicles (220a-c) to fully computer controlled virtual vehicles (230a-c) operating in the virtual environment (200).

12. The method according to claim 11, wherein the ratio is being controlled to be maintained at a certain level.

13. A non-transitory computer readable medium comprising instructions that when executed by one or more processors (504) causes the server (500) to perform the method according to claim 1.

14. A server (105; 500) for supporting generation of scenarios for testing autonomous driving and/or advanced driver assistance system, AD/ADAS, functionality for one or more real world vehicles, wherein the server (105; 500) is configured to:
provide (301) a virtual environment (200) simulating an environment relevant for operation of one or more vehicles having said AD/ADAS functionality and in which the virtual environment (200) it is operating: one or more fully computer controlled movable virtual objects (230a-c), one or more human controlled movable virtual objects (220a-c) and at least one virtual AD/ADAS vehicle (210) operating according to said AD/ADAS functionality, and allow (302) devices (101-103) to remotely connect to the server (105; 500) and users of said devices (101-103) to, via user interfaces of the devices (101-103), control said human controlled movable virtual objects (220a-c), respectively, in the virtual environment (200), and thereby cause generation of scenarios that one or more of said at least one virtual AD/ADAS vehicle (210) are subjected to and which scenarios are resulting from at least one of said one or more human controlled movable virtual objects (220) affecting one or more of the following: said one or more fully computer controlled movable virtual objects (230*a-c*), said at least one virtual AD/ADAS vehicle (210), and the virtual environment (200).

\* \* \* \* \*